United States Patent
Naruto

(10) Patent No.: US 8,125,538 B2
(45) Date of Patent: Feb. 28, 2012

(54) IMAGING APPARATUS, IMAGING SYSTEM, ELECTRONIC APPARATUS, RECORDED IMAGE MANAGEMENT SYSTEM AND PROGRAM

(75) Inventor: Hirokazu Naruto, Osaka (JP)

(73) Assignee: Sony Corporation (JP)

( * ) Notice: Subject to any disclaimer, the term of this patent is extended or adjusted under 35 U.S.C. 154(b) by 619 days.

(21) Appl. No.: 12/288,057

(22) Filed: Oct. 16, 2008

(65) Prior Publication Data

US 2009/0109302 A1    Apr. 30, 2009

(30) Foreign Application Priority Data

Oct. 25, 2007   (JP) ................................. P2007-277206

(51) Int. Cl.
*H04N 5/76* (2006.01)

(52) U.S. Cl. ................ 348/231.5; 348/231.2; 348/231.3

(58) Field of Classification Search .................... None
See application file for complete search history.

(56) References Cited

U.S. PATENT DOCUMENTS

2006/0131430 A1* 6/2006 Ito ................................. 235/492
2007/0110014 A1* 5/2007 Mizuguchi .................... 370/338

FOREIGN PATENT DOCUMENTS

| JP | 7-231419 A | 8/1995 |
|---|---|---|
| JP | 2001-177750 A | 6/2001 |
| JP | 2002-374443 A | 12/2002 |
| JP | 2005-217479 A | 8/2005 |
| JP | 2006-115017 A | 4/2006 |
| JP | 2006-287741 A | 10/2006 |

* cited by examiner

*Primary Examiner* — Jason Chan
*Assistant Examiner* — Yih-Sien Kao
(74) *Attorney, Agent, or Firm* — Lerner, David, Littenberg, Krumholz & Mentlik, LLP

(57) ABSTRACT

An imaging apparatus includes a reading means for reading information stored in a non-contact communication type portable information storage device and a control means for storing first information in information read by the reading means by associating the information with recorded images.

20 Claims, 17 Drawing Sheets

FIG. 3

| | USE DATE | USE TIME | ENTRY/EXIT | STATION NAME | BALANCE | MEMO |
|---|---|---|---|---|---|---|
| L1 → | 05/05/2008 | 9:00 | ENTRY | OSAKA | 8,000 | |
| L2 → | 05/05/2008 | 10:00 | EXIT | KYOTO | 7,460 | |
| L3 → | 05/06/2008 | 9:30 | ENTRY | KYOTO | 7,460 | |
| L4 → | 05/06/2008 | 11:00 | EXIT | KOBE | 6,410 | |

Columns marked: T0 (BALANCE), T1, T4, T5 (MEMO area)

20A

PICT0001

PICT0002

PICT0101

<IMAGING>

<CARD TOUCH>

<PURCHASE>

FIG. 11

| | USE DATE | USE TIME | STORE NAME | ITEM | PRICE | BALANCE | OTHERS |
|---|---|---|---|---|---|---|---|
| L11 → | 05/03/2008 | 19:00 | PA | ○○ | 10,000 | 20,000 | |
| L12 → | 05/04/2008 | 11:00 | PB | ○○○ | 5,000 | 15,000 | |
| | | | | | ↑ T21 | ↑ T31 | |

FIG. 12

| USE DATE | USE TIME | STORE NAME | ITEM | PRICE | BALANCE | OTHERS |
|---|---|---|---|---|---|---|
| 05/02/2008 | 16:30 | ◯◯◯ STADIUM | ENTRANCE FEE | 2,000 | 30,000 | |
| | | | | | | |

IMAGING APPARATUS, IMAGING SYSTEM, ELECTRONIC APPARATUS, RECORDED IMAGE MANAGEMENT SYSTEM AND PROGRAM

CROSS REFERENCE TO RELATED APPLICATIONS

The present application claims priority from Japanese Patent Application No. JP 2007-277206, filed in the Japanese Patent Office on Oct. 25, 2007, the entire content of which is incorporated herein by reference.

BACKGROUND OF THE INVENTION

1. Field of the Invention

The invention relates to a technique of adding information concerning recorded images to the recorded images.

2. Description of the Related Art

In an imaging apparatus such as a digital camera, additional information such as recorded time is added to the recorded images and stored for filing and/or search of recorded images.

As such additional information, it is preferable that information concerning not only recorded time but also recorded places is recorded.

As a technique of recording information concerning recorded places, there exists a technique in which recorded places are recorded in an image file by connecting a GPS (Global Positioning System) unit.

However, the GPS unit is relatively expensive, therefore, to mount the GPS unit on an actual imaging apparatus and the like is not always adequate technique when considering costs and the like.

Accordingly, a technique of recording information of recorded places in the image file easily without using the GPS unit is proposed (refer to JP-A-2005-217479, JP-A-2006-287741 (Patent Documents 1 and 2) and so on).

For example, in Patent Document 1, it is disclosed that the imaging apparatus receives information transmitted from an information transmission apparatus (wireless tag) installed at each recorded place in advance, and the imaging apparatus adds information such as the received recorded places to the image data and records the information.

In Patent Document 2, a technique of allowing a car-navigation device to cooperate with the imaging apparatus is disclosed, in which address information of recorded places by the imaging apparatus is received by the car-navigation system and the received address information is stored by being associated with image data as information concerning the recorded places.

SUMMARY OF THE INVENTION

However, it is assumed that the information transmission apparatus is installed at each recorded place in advance in Patent Document 1, therefore, it is difficult to add information concerning recorded places at recorded places other than such recorded place. That is, the situation in which the technique is applied is limited.

In Patent Document 2, the technique can be used in a situation of using a vehicle on which the car navigation device is mounted, however, it is difficult to apply the technique to other situations. That is, the situation in which the technique is applied is limited.

Thus, it is desirable to provide a technique in which information can be added to recorded images easily as well as information can be added to recorded images in various situations.

According to an embodiment of the invention, there is provided an imaging apparatus including a reading means for reading information stored in a non-contact communication type portable information storage device and a control means for storing first information in information read by the reading means by associating the information with recorded images.

According to an embodiment of the invention, there is provided an imaging system including a non-contact communication type portable information storage device and an imaging apparatus, in which the imaging apparatus includes a reading means for reading information stored in the portable information storage device and a control means for storing information read by the reading means by associating the information with recorded images.

According to an embodiment of the invention, there is an electronic apparatus including a reading means for reading information stored in a non-contact communication type portable information storage device and a control means for storing information read by the reading means by associating the information with recorded images.

According to an embodiment of the invention, there is provided a recorded image management system including a non-contact communication type portable information storage device and an electronic apparatus, in which the electronic apparatus includes a reading means for reading information stored in the portable information storage device and a control means for storing information read by the reading means by associating the information with recorded images.

According to an embodiment of the invention, there is provided a program for allowing a computer to execute the steps of (a) reading information stored in a non-contact communication type portable information storage device and (b) storing information read in the step (a) by associating the information with recorded images.

According to an embodiment of the invention, a program executable by a computer included in a cellular phone device, allowing the computer to execute (a) a step of receiving information input by an inputting means provided at the cellular phone device and temporarily storing the inputted information, and (b) a step of executing non-contact communication between the cellular phone device and an imaging apparatus and transmitting information temporarily stored in the step (a) to the imaging apparatus as information to be associated with image data stored in the imaging apparatus.

According to the embodiments of the invention, it is possible to add information to recorded images easily as well as information can be added to recorded images in various situations.

BRIEF DESCRIPTION OF THE DRAWINGS

FIG. 3 is a chart showing the record contents in a non-contact type IC card;

FIG. 11 is a chart showing the record contents in a non-contact type IC card;

FIG. 12 is a chart showing another record contents;

DESCRIPTION OF THE PREFERRED EMBODIMENTS

Hereinafter, embodiments of the invention will be explained with reference to the drawings.

1. First Embodiment

1-1. Summary

Figure 1:
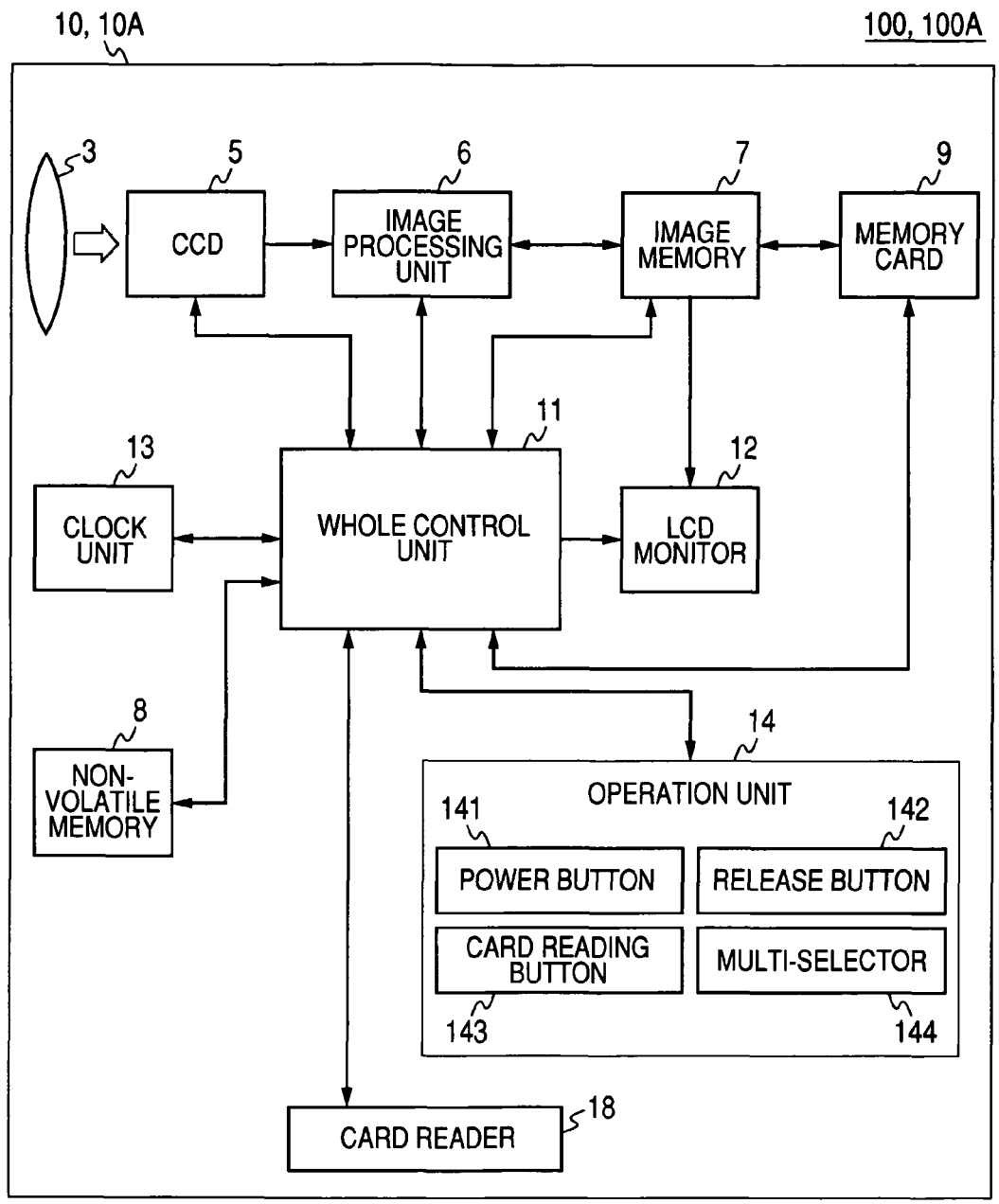
FIG. 1 is a schematic diagram showing a configuration of an imaging system.
Figure 1:
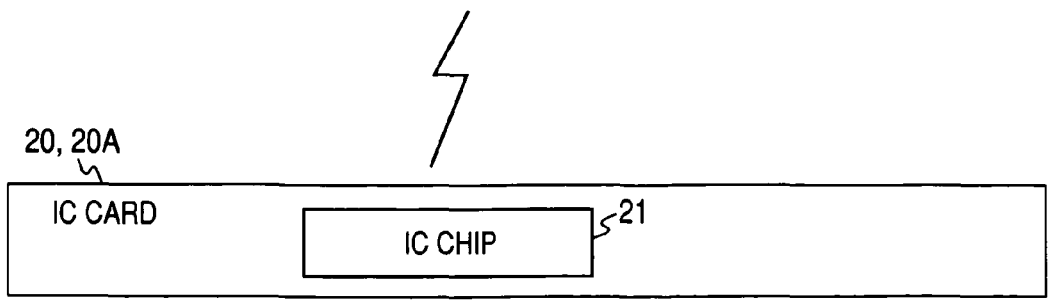
Figure 2:
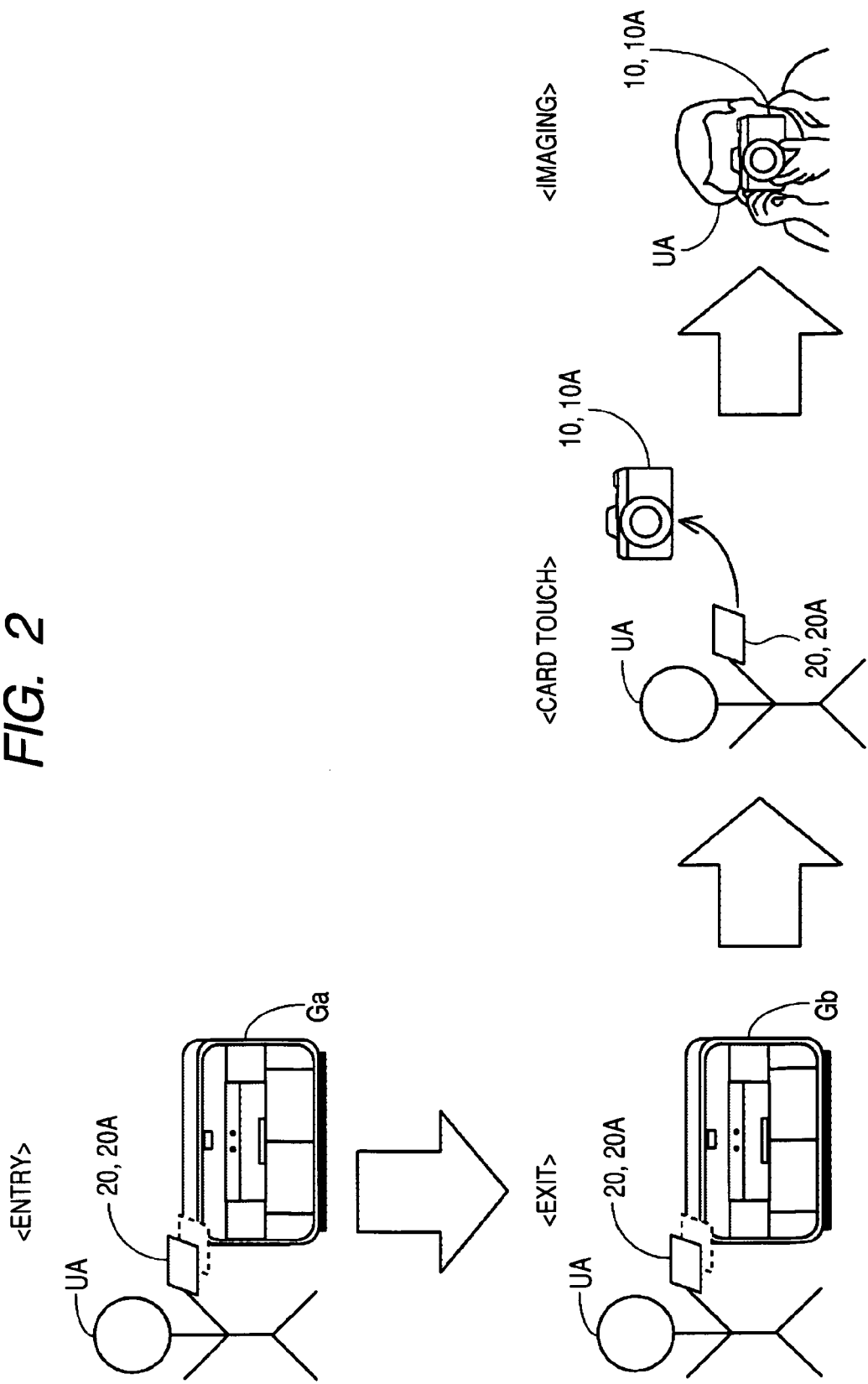
FIG. 2 is a conceptual view showing a use situation of the imaging system.

FIG. 1 is a block diagram showing an imaging system 100 (100A) and FIG. 2 is a view showing a use situation of the imaging system. FIG. 2 shows a situation in which information of a station where one gets on or off a train is automatically added to a recorded image.

As shown in FIG. 1, the imaging system 100 includes a digital camera 10A (imaging apparatus) and a portable non-contact type IC card 20A. The non-contact type IC card 20A is an example of a non-contact communication-type (also called as a non-contact reading type and so on) portable information storage device. As the non-contact communication type portable information storage device, "Felica" (Trademark) and the like are widely used.

An IC chip 21 which controls storage processing and communication processing of information is incorporated in the non-contact type IC card 20A, which can perform record processing of accounting information and the like. The non-contact type IC card 20A further includes a coil for communication (communication means). As described later, information in the non-contact type IC card 20A is read out to the digital camera 10A by communication between the non-contact type IC card 20A and a card reader 18 of the digital camera 10A.

Physical contact between the non-contact type IC card 20A and an electrical contact point in the reading device side is not necessary, and the non-contact type IC card 20A can perform non-contact communication (namely, wireless communication) with the reading device (such as the card reader 18). The non-contact IC card can read information and the like easily as compared with a contact type IC card (which has an electric contact point and read information and the like by communication with physical contact with respect to an electric contact point of the reading device).

As a non-contact type IC card 20A, the one which functions as tickets for public transportation (for example, railways, buses and the like) is cited as an example. In the non-contact type IC card 20A, use information (use record) such as a use date, a use time, entry/exit, a station name, and a balance is stored as shown in FIG. 3. As the non-contact type IC card 20A which can be used as tickets, a close-contact type (close-communication type) non-contact IC card, more specifically, Suica (Trademark), ICOCA (Trademark) and the like can be cited as examples.

The digital camera 10A includes an imaging lens 3, an imaging device (such as a CCD) 5, an image processing unit 6 and an image memory 7. An image (optical image) of a subject which is incident through the imaging lens 3 is focused on an imaging surface of the imaging device 5, being converted into electronic data due to photoelectric conversion effect of the imaging device 5. In addition, various signal processing such as A/D (analog/digital) conversion processing, γ (gamma) correction processing and WB (white balance) processing is performed to an image signal acquired in the imaging device 5 to generate image data. The generated image data is temporarily stored in an image memory 7 as well as transferred to a memory card 9 to be stored therein.

The digital camera 10A includes a whole control unit 11, a back-face monitor 12, a clock unit 13, an operation unit 14 and a card reader 18.

The back-face monitor (liquid crystal monitor) 12 is provided, for example, at the center of the back face of the digital camera 10A. The back-face monitor 12 is formed as, for example, a color liquid crystal display (LCD). The back-face monitor 12 is capable of displaying a menu screen for setting imaging conditions and the like, playing back and displaying recorded images recorded in the memory card 9 in a playback mode.

The clock unit 13 is a unit realizing a clocking function, which can acquire present time and the like. According to clocking results by the clock unit 13, recorded time and the like of respective recorded images can be determined.

The card reader 18 is arranged, for example, in the vicinity of a bottom face of a camera body, functioning as a reading unit (also called as a readout unit) which reads information stored in the above non-contact type IC card 20A. Information in the non-contact type IC card 20A is read out by the card reader 18 at the time of approaching operation (also called as a card-touch operation) in which the non-contact type IC card 20A is moved so as to approach as well as slightly touch the bottom face of the camera body, which is temporarily stored in a non-volatile memory 8 of the digital camera 10A. As described later, in a "card-information addition mode" of the digital camera 10A, information read out by the card reader 18 and stored in the non-volatile memory 8 is added to the recorded image data at the time of imaging to be stored.

The reason that the non-contact type IC card 20A is allowed to slightly touch the bottom face of the digital camera 10A in the approaching operation is for allowing the non-contact type IC card 20A to sufficiently approach within a distance in which communication with the digital camera 10A is possible (for example, approximately several centimeters to ten several centimeters). That is, the communication between the non-contact type IC card 20A and the digital camera 10A can be executed without contact between both casings (namely, in a state that both are not in contact with each other).

The operation unit 14 has various operation members including a power button 141, a release button 142, a card reading button 143 and a multi-selector 144.

The power button 141 performs switching between ON-state and OFF-state of the digital camera 10A.

The release button 142 is a two-stage detection button which can detect two states of a half-pressed state (S1-state) and a completely-pressed state (S2-state). When the release button 142 is half pressed and in the S1-state, a preparation operation for acquiring a still image for recording (actual imaging) concerning a subject (for example, an AF control operation, an AE control operation and the like) is performed. When the release button 142 is further pressed and is in the S2-state, an imaging operation of the actual imaging (a series of operation in which an exposure operation concerning a subject image (optical image of the subject) is performed by using the imaging device 5 and a prescribed image processing is performed to an image signal obtained by the exposure operation) is performed.

The card reading button 143 is an operation button for instructing the start of a card reading operation. In a predetermined period after the card reading button 143 is pressed (for example, five seconds), the power is supplied to the card reader 18, which enables the reading operation by the card reader 18. After the card reading button 143 is pressed, when an operator allows the non-contact type IC card 20A to approach the bottom surface side of the camera body (namely, the card reader 18), communication is performed between the non-contact type IC card 20A and the card reader 18. According to the communication (non-contact communication (wireless communication)), information in the non-contact type IC card 20A is read out by the card reader 18 to be temporarily stored in the non-volatile memory 8 of the digital camera 10A.

The multi-selector 144 (refer to FIG. 14) includes a direction button having four directions of up and down, right and left and a decision button at the center. The multi-selector 144 can perform various setting operations by working with a setting screen displayed on the back-face monitor 12.

The whole control unit 11 is constituted as a microcomputer, including a CPU, a memory, a ROM (EEPROM) and the like. The whole control unit 11 reads a software program (hereinafter, also referred to as merely a program) stored in the ROM and executes the program by the CPU to realize various functions. For example, the whole control unit 11 controls operation of determining part of information in the non-contact type IC card 20A read by the card reader 18 as "recorded image related information" and storing so as to associate the recorded image related information with recorded images.

1-2. Operation

Figure 4:
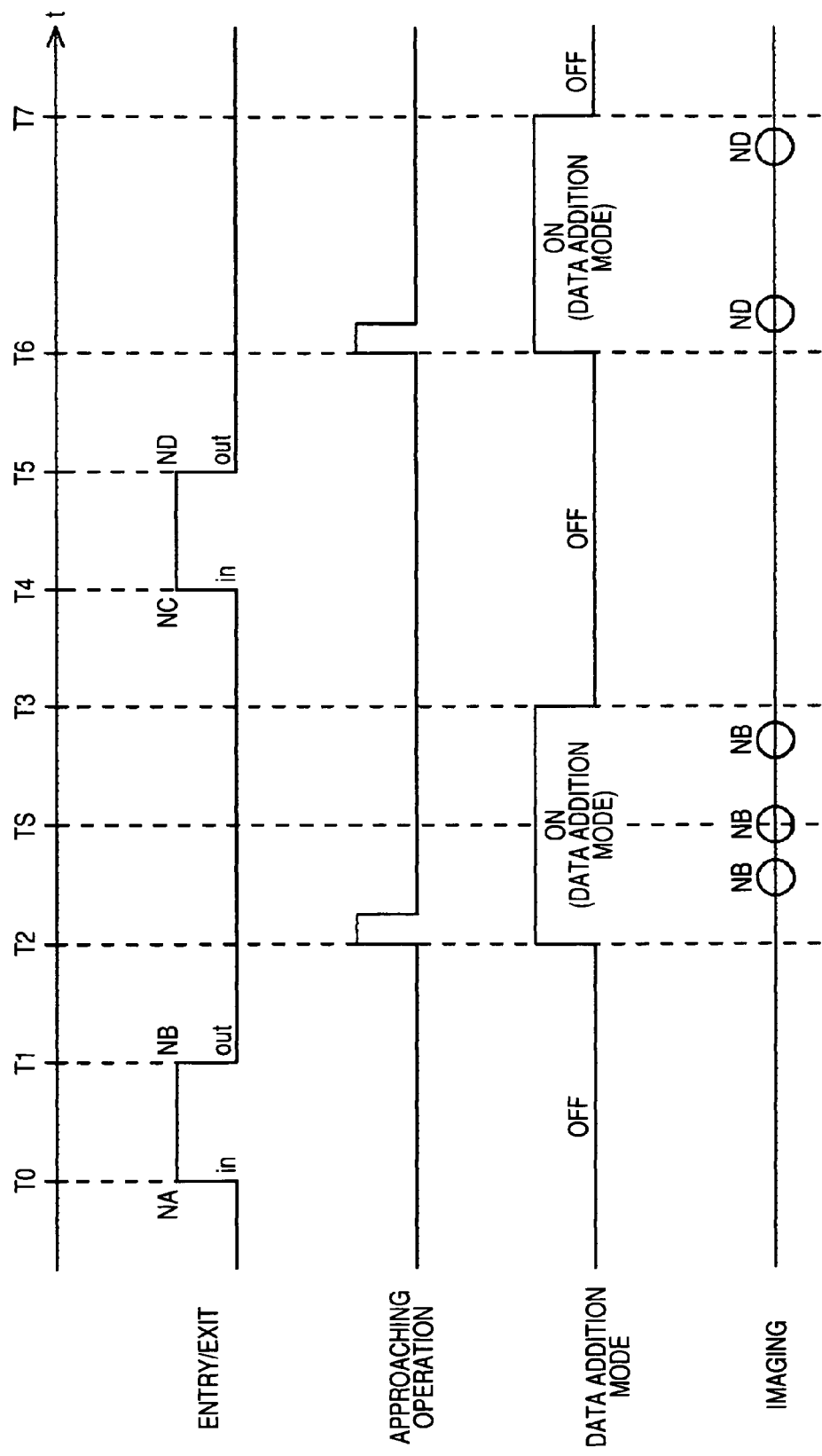
FIG. 4 is a timing chart showing operations according to a first embodiment.

In the embodiment, operation shown in FIG. 2 and FIG. 4 is assumed. FIG. 4 is a timing chart showing the operation.

First, a user UA enters a station NA (for example, "Osaka station" at a time T0. At the time of entry, the user UA performs the approaching operation of allowing the non-contact type IC card 20A which is carried by the user to approach and slightly touch a reading unit in an automatic ticket checker Ga of the station NA. The automatic ticket checker Ga writes an entry record in the non-contact type IC card 20A according to the approaching operation. Accordingly, the entry record is stored in the non-contact type IC card 20A. For example, as shown in a column L1 of FIG. 3, information such as a use date "2008/05/05", a use time "9:00", "entry", an entry station name "Osaka station", a card balance "8,000 yen" and the like is stored in the non-contact type IC card 20A. Information shown in columns L2 to L4 is not stored at this time yet.

After that, the user UA moves by train and arrives at a station NB (for example, "Kyoto station"), then, exits from the station NB at a time T1. At the time of exiting, the user UA performs the approaching operation of allowing the non-contact type IC card 20A carried by the user UA to approach as well as slightly touch a reading unit of an automatic ticket checker Gb of the station NB. According to the approaching operation, the automatic ticket checker Gb writes an exit record in the non-contact type IC card 20A. Accordingly, the exit record is stored in the non-contact type IC card 20A. For example, as shown in a column L2 of FIG. 3, information such as a use date "2008/05/05", a use time "10:00", "exit", an exit station name "Kyoto station", the card balance "7,460 yen" and the like is further written in the non-contact type IC card 20A. Information shown in columns after L3 is not stored at this time yet, and the information shown in the column L2 is the latest information.

As described above, the non-contact type IC card 20A includes use record (also referred to as use history) of public transportation (the railway in this case) concerning the user UA. The user UA is a user of the digital camera 10A as well as a user of the non-contact type IC card 20A. In the non-contact type IC card 20A, "entry/exit information" which is information associated with time instants (time) (also referred to as "time associated information") is stored. The "entry/exit information" can be expressed as information ("time associated information"), in which place information such as entry/exit station names and "entry/exit time" which is time corresponding to the place information are stored by being associated with each other.

At the time T2 (for example, just after the exit from the station NB), the user UA presses the card reading button 143 of the digital camera 10A. After that, the user UA performs the approaching operation (card touch operation) of allowing the non-contact type IC card 20A to approach the bottom face side of the camera body (namely, the card reader 18). According to the approaching operation, the digital camera 10A reads various information in the non-contact type IC card 20A by using the card reader 18 and stores the information in the non-volatile memory 8. The digital camera 10A sets a mode of the digital camera 10A to "data addition mode". The "data addition mode" is a mode in which suitable data (information) is automatically added to image data at the time of imaging.

After that, when imaging is performed by the digital camera 10A after the time T2, suitable data (also referred to as "additional data") is stored by being associated with the recorded image. That is, at each imaging time of each recorded image, additional data automatically determined is stored by being associated with the recorded image. In more detail, image data of the recorded image is stored in a state in which "additional data" is added to the data. In other words, "additional data" is stored as part of the recorded image data.

The contents of the additional data are determined based on the recorded time of the recorded image and time related information (specifically, time information included in entry/exit record (use record)) read by the card reader 18 and stored in the non-volatile memory 8.

For example, information of an exit station included entry/exit information (refer to the column L2 of FIG. 3) at the time before the recorded time (time TS) of the recorded image as well as the latest time (time T1) is determined as "additional data". In detail, information of the exit station (also referred to as a get-off station) NB where the user gets off the train and exits from the station at a time (time T1) before the recorded time (time TS) of the recorded image as well as at the latest time is determined as "additional data". More specifically, name information of the nearest exit station NB (for example, "Kyoto station") read out by the card reader 18 is determined as "additional data". As described above, information of the latest exit station NB with respect to the recorded time of the recorded image, namely, place information concerning use record at the time nearest to the recorded time of the recorded image is determined as "additional data".

In the embodiment, the contents of the "additional data" are determined just after the approaching operation at the time T2 and are temporarily stored in the nonvolatile memory 8. In detail, the digital camera 10A temporarily stores information in the non-volatile memory 8, which is selected and determined as "additional data" from various information read from the non-contact type IC card 20A. The additional data is copied and transferred from the non-volatile memory 8 to the memory card 9 to be stored by being associated with each recorded image at each recorded time.

Figure 5:
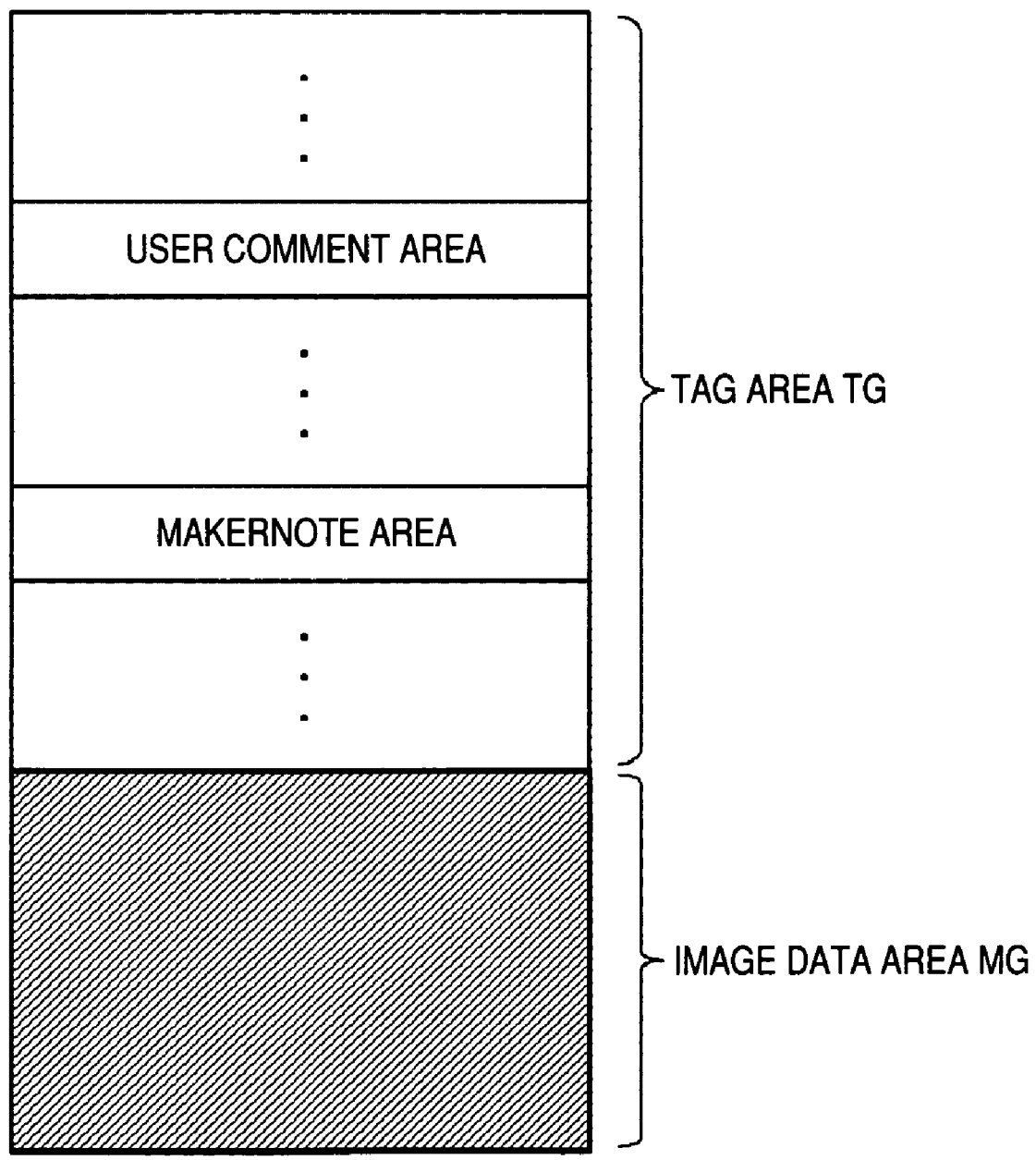
FIG. 5 is a view showing a memory map of recorded image data.

FIG. 5 is a view showing a memory map of data of one recorded image (recorded image data) expressed by a prescribed format (for example, EXIF (Exchangeable Image File Format). As shown in FIG. 5, one recorded image data includes a tag area TG and an image data area MG.

In the image data area MG, data expressing an image itself of the recorded image (image data) is stored in a prescribed format (for example, JPEG format). In the tag area TG, various information concerning the recorded image, for example, a recorded date, recorded time, shutter speed at the time of imaging, an aperture value, ISO sensitivity and the like are stored. The tag area TG further includes a user comment area in which writing by a user is allowed and a makernote area in which writing by a developing company (maker) is allowed.

At respective recorded time points from the time T2 to a (sequentially described) time T3, name information of the nearest exit station NB (for example, "Kyoto station") is stored in part of the tag area TG of each recorded image, for example, in the user comment area. It is not limited to this, and it is also preferable that name information of the nearest exit station NB and the like is stored in an area other than the user comment area, for example, in the makernote area.

Figure 6:
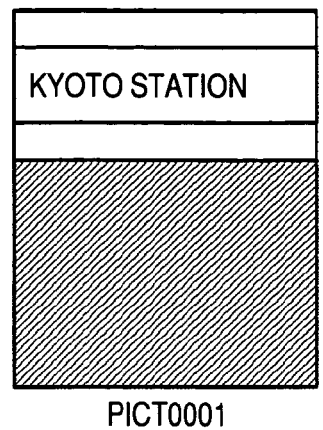
FIG. 6 is a view conceptually showing plural recorded images.
Figure 6:
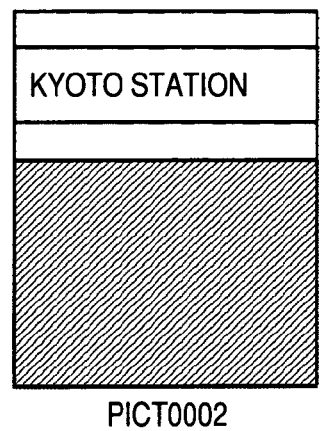
Figure 6:
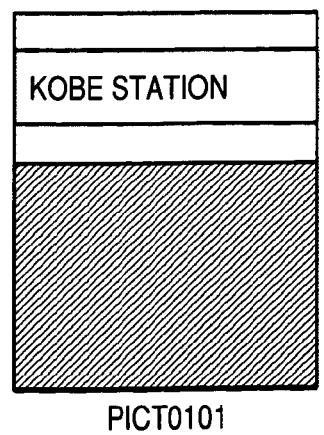

Specifically, as shown in FIG. 6, additional data "Kyoto station" is stored in the tag area TG with respect to recorded image data "PICT0001", "PICT0002" ... recorded from the time T2 to time T3. FIG. 6 is a view conceptually showing plural recorded images stored in the memory card 9.

After that, at the time T3, when an operation of setting cancellation of "data addition mode" is executed by pressing the card reading button 143, for example, for a long period of time, the "data addition mode" is cancelled. At the time of imaging after the "data addition mode" is cancelled, information of the nearest exit station is not added to the recorded image data.

After that, the similar operation will be repeated after a time T4.

For example, the user UA enters a station NC at a time T4 and exits from a station ND at a time T5 using the non-contact type IC card 20A, then, the above approaching operation (operation of allowing the non-contact type IC card 20A to approach the digital camera 10A) and the like is performed at a time T6 after that. At recorded time points after the time T6, name information of the nearest exit station ND (for example, "Kobe station") is stored by being associated with recorded images at this time. The photographing operation with such data addition is continued until the "data addition mode" is cancelled.

Specifically, as shown in FIG. 6, additional data "Kobe station" is stored in the tag area TG with respect to recorded image data "PICT0101" ... recorded from the time T6 to time T7.

According to the above operation, data is automatically added to the recorded image data, therefore, information can be easily added to the recorded images. That is, information which can be used for search and/or filing of information can be easily added. In addition, data can be automatically added to the recorded image data by using the non-contact type IC card 20A which is usually carried, therefore, it is possible to add information to the recorded images in various conditions. According to the addition of such information, the information can be used as keywords at the time of searching or filing.

Especially, the information transmission device previously set at the recorded place such as disclosed in the Patent Document 1 and the in-vehicle car navigation system such as disclosed in the Patent Document 2 are not suitable for being carried. Whereas, the non-contact type IC card 20A of the embodiment is suitable for being carried, and is often carried by the user. According to the embodiment, it is possible to perform data addition easily by using the non-contact type IC card 20A which can be easily used.

The contents of additional data (recorded-image related information) is determined based on the recorded time of the recorded image and time related information read by the card reader 18, therefore, it is possible to determine additional data having suitable contents in which time lapse is considered.

Additionally, it is possible to easily add information (place information) of a station near the recorded place of the recorded image (nearest station and the like) by using station information (place information) in the non-contact type IC card 20A as the additional data.

In the embodiment, the case in which "data addition mode" is cancelled according to explicit operation of setting cancellation is cited as an example, however, it is not limited to this. For example, it is preferable that the data addition mode is automatically cancelled when the date is changed. It is also preferable that the data addition mode is automatically cancelled when a fixed period of time (for example, five hours) passes.

2. Second Embodiment

In the first embodiment, the case in which data is added each time the imaging is performed after the time T2 at the time of approaching operation (card touch operation) has been cited as an example, however, it is not limited to this. For example, it is preferable that data is added afterward to one or plural images which have been recorded. In a second embodiment, such modification example will be explained. Hereinafter, explanation will be made by focusing on points which are different from the first embodiment.

Figure 7:
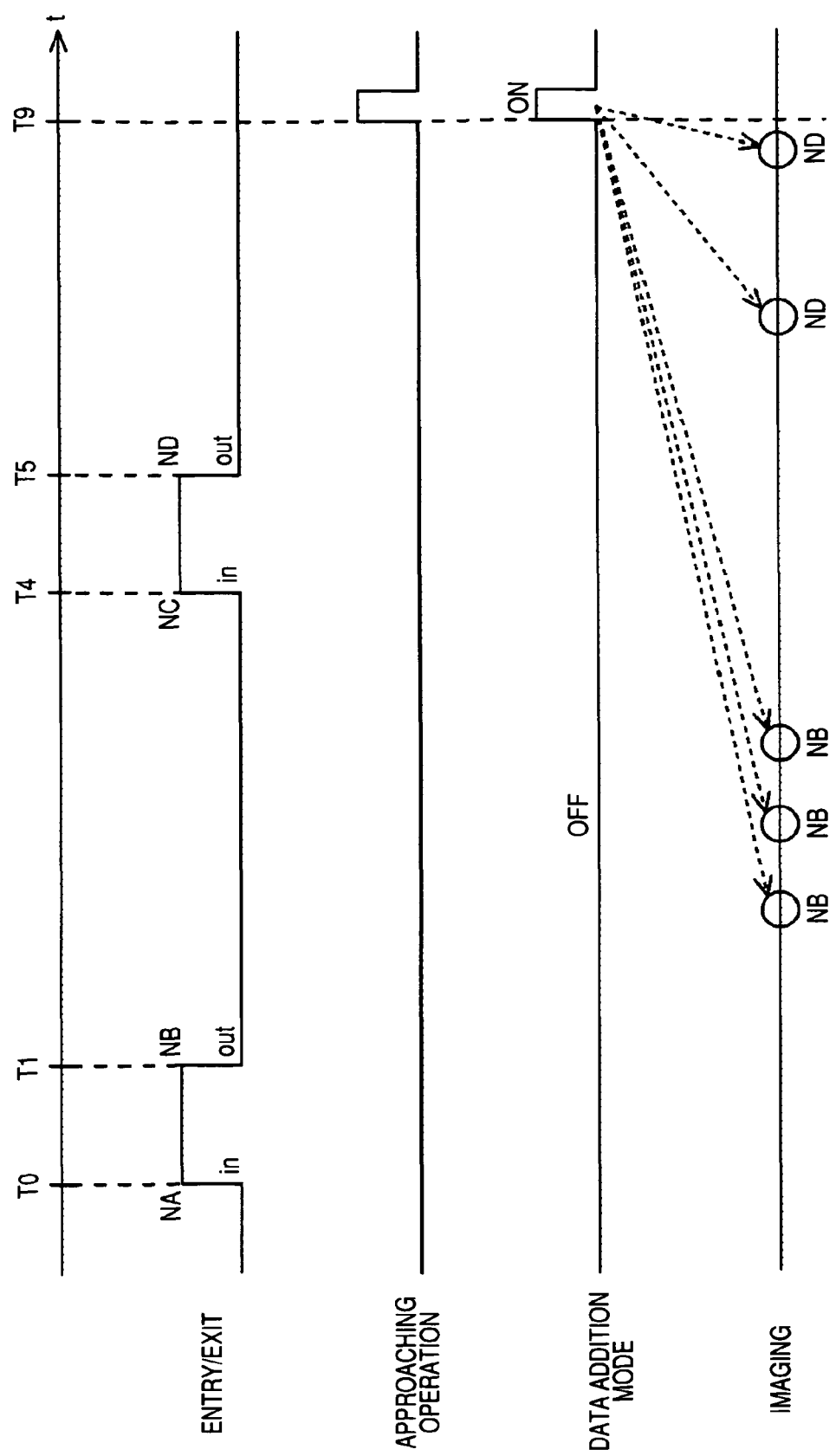
FIG. 7 is a timing chart showing operations according to a second embodiment.

FIG. 7 is a timing chart relating to such modification example. In FIG. 7, after the exit from the exit station NB (time T1), the imaging operation by the digital camera 10A is performed at any time without the approaching operation (card touch operation) by the non-contact type IC card 20A. Therefore, at respective recorded time points, data addition processing is not performed yet.

After that, at a point of time T9, when a pressing operation of the card reading button 143 of the digital camera 10A and the approaching operation of allowing the non-contact type IC card 20A to approach the digital camera 10A are executed, batch data addition processing with respect to recorded images is performed.

For example, as shown in FIG. 7, information of the nearest exit station NB (for example, station name "Kyoto station") is added to recorded image data recorded from the time T1 to the time T4. Also, information of the nearest exit station ND (for example, station name "Kobe station") is added to recorded image data recorded from the time T5 to the present time T9. Accordingly, name information of the entry/exit station NB (, NC or ND) which is nearest to the recorded time is determined as "additional data" based on the recorded time of each recorded image and time related information in the non-contact type IC card 20A read by the card reader 18, which is added to respective recorded images.

According to the above operation, the same advantages as the first embodiment can be obtained.

The case in which batch data addition, namely, data is added to all images in the memory card 9 is cited as an example, however, it is not limited to this. For example, it is also preferable that data is added to all images in a certain folder in the memory card 9. Further, it is preferable that data addition processing is performed only to recorded image data to which data addition processing is not performed yet. It is also preferable that data addition processing is performed only to one or plural recorded images selected according to the explicit selection operation by the user.

3. Third Embodiment

A third embodiment is also a modification example of the first embodiment. In the third embodiment, data addition processing is performed at respective recorded points after the approaching operation in the same manner as the first embodiment in principle. However, when the approaching operation of the non-contact type IC card 20A is performed again, correction processing of additional data is performed.

Figure 8:
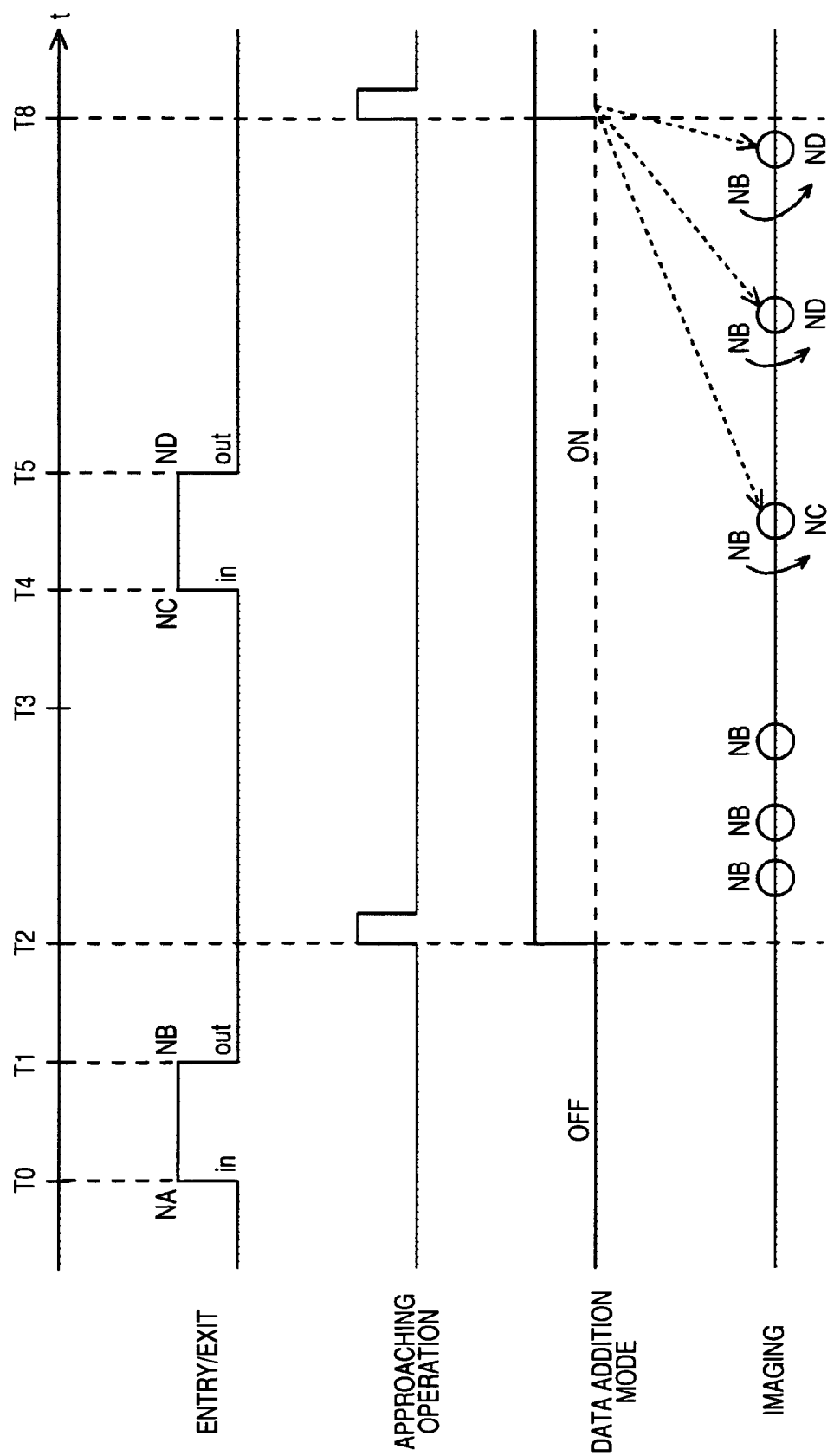
FIG. 8 is a timing chart showing operations according to a third embodiment.

FIG. 8 is a timing chart relating to such modification example. As shown in FIG. 8, a point that the approaching operation is performed at the time T2 and the data addition mode is started is the same as the first embodiment (refer to FIG. 4). However, the third embodiment is different from the first embodiment in a point that the data addition mode is not cancelled after the time T3 and the data addition mode is still set even when reaching a time T8. In addition, a point that the approaching operation using the non-contact type IC card 20A is performed again is different from the first embodiment.

At respective recorded time points from the time T2 to the time T4, information of the station NB is added to respective recorded image data. Also at respective recorded time points from the time T4 to the time T8, information of the latest exit station NB is added once to respective recorded image data. The approaching operation (touch operation) is not performed from the time T4 to time T8, and information of the latest exit station in the non-volatile memory 8 is not updated. Therefore, the previous entry/exit station NB is stored as additional data, not the actual latest entry/exit station ND.

After that, at the time T8, when the approaching operation (card touch operation) using the non-contact IC card 20A is performed again, the following data correction operation is executed.

Specifically, first, additional data concerning recorded image data after the time included in new entry/exit information is updated based on new entry/exit information (get on/off information) read from the non-contact type IC card 20A.

For example, time when a new entry/exit was performed first after the time point T2 when the previous approaching operation by the non-contact type IC card 20A (time T4 in this case) was performed is calculated, and additional data of recorded images recorded after the time T4 is corrected.

Specifically, information of the nearest entry/exit station (entry station in this case) NC is added to recorded images at respective recorded time points from the time T4 to the time T5, instead of information of the station NB. That is, the information of the station NB is deleted and information of the station NC ("Kyoto station") is registered. In this case, the station NB and the station NC are the same, therefore, "additional data" is not changed in the event, however, when the station NB is different from the station NC, "additional data" is changed.

Additionally, information of the nearest entry/exit station (exit station in this case) ND is added to recorded images at respective recorded time points from the time T5 to the time T8, instead of information of the station NB. Namely, the information of the station NB is deleted and information of the station ND is registered. That is, the additional data is updated.

As described above, the operation of correcting additional data with respect to the recorded image data obtained before the time T8 is executed.

After the time T8, information of the station ND is tentatively added as long as the setting of "data addition mode" is continued. After that, when the approaching operation by the non-contact type IC card 20A is performed again, the correction operation of additional data is performed in the same manner as described above. When the "data addition mode" is cancelled, the data addition operation with respect to recorded images is not executed.

4. Fourth Embodiment

In the first embodiment to the third embodiment, the cases in which the non-contact type IC card 20A as the "ticket card" is used were cited as examples, however, it is not limited to this. For example, it is also preferable that a non-contact type IC card 20B as an "electronic money card" is used instead of the non-contact type IC card 20A. In a fourth embodiment, such modification example will be explained.

Figure 9:
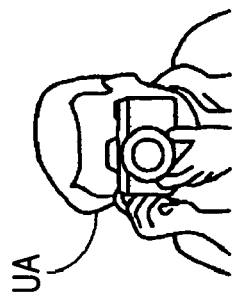
FIG. 9 is a conceptual view showing the flow of operations according to a fourth embodiment.
Figure 9:
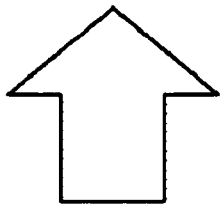
Figure 9:
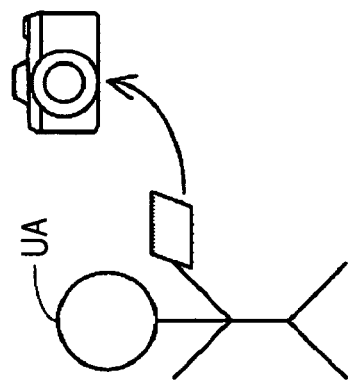
Figure 9:
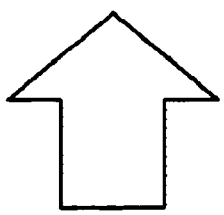
Figure 9:
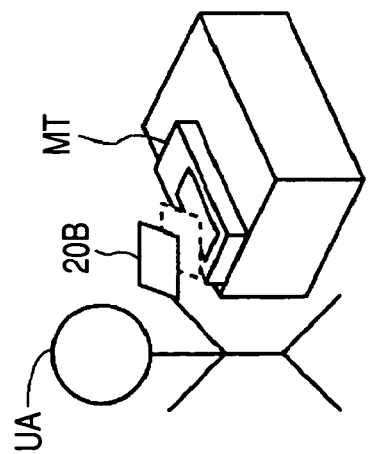
Figure 10:
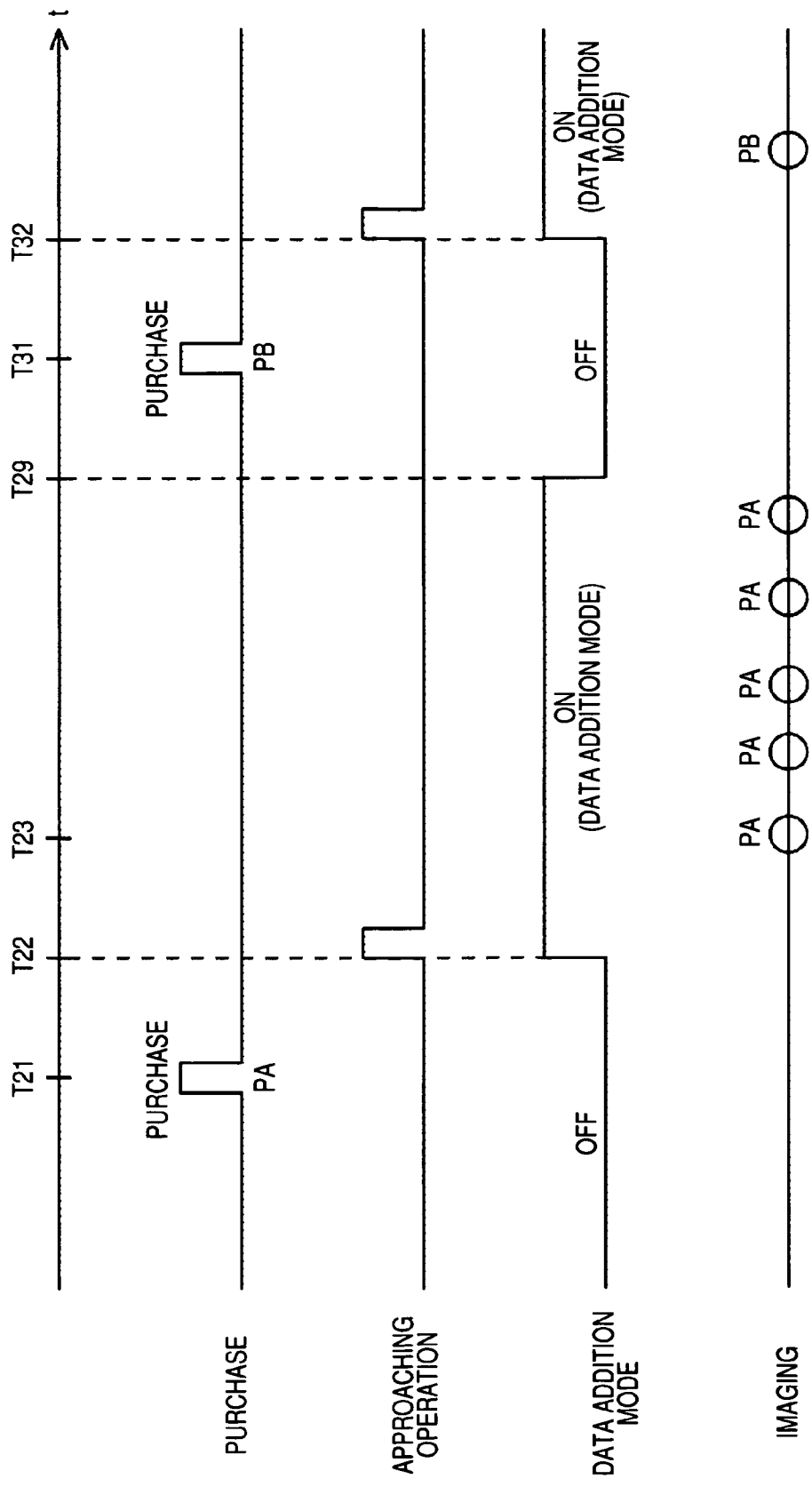
FIG. 10 is a timing chart showing operations according to the fourth embodiment.

FIG. 9 is a conceptual view showing the operation flow relating to the fourth embodiment and FIG. 10 is a timing chart relating to the fourth embodiment.

As shown in FIG. 9 and FIG. 10, first, a situation in assumed in which the user UA purchases goods at a store using an electronic money card. Specifically, the user US performs settlement processing by allowing the non-contact type IC card 20B to approach an electronic money terminal MT installed in a store PA (time T21). In detail, a reading operation and a writing operation concerning information of the non-contact type IC card 20B are executed by the electronic money terminal MT. At this time, information shown in a column L11 of FIG. 11 is recorded in the non-contact IC card 20B. Note that information shown in a column L12 is not recorded at this time yet.

As shown in FIG. 11, use information (use record) such as a use date, a use time, a store name, an item name, a price, and a balance is stored in the non-contact IC card 20B. As the non-contact IC card 20B which can be used as an electronic money card, an approaching type non-contact IC card, in more detail, "Edy" (Trademark), "nanako" (Trademark) and the like are cited as examples.

As described above, the non-contact IC card 20B includes purchase record (also referred to as use record or use history) by the electronic money with respect to the user UA. The user UA is a user of the digital camera 10A as well as a user of the non-contact IC card 20B. The non-contact IC card 20B also records "purchase record" which is information related to time (also referred to as "time related information"). The "purchase record" can be also expressed as information in which place information such as a purchasing store name and "purchasing time" which is time corresponding to the place information are stored by being associated with each other.

After that, the user UA, first, presses the card reading button 143 of the digital camera 10A at a time T22 (for example, just after the purchasing of the item), then, performs the approaching operation which allows the non-contact type IC card 20B to approach the bottom surface side of the camera body (namely, the card reader 18). According to the approaching operation, the digital camera 10A reads various information in the non-contact type IC card 20B by using the card reader 18 and stores the information in the non-volatile memory 8. The digital camera 10A sets the mode of the digital camera 10A to "data addition mode". The "data addition mode" is a mode in which suitable data (information) is automatically added to image data at the time of imaging.

After that, when imaging is performed by the digital camera 10A after the time T22, information (place information and the like) based on use record (purchase record) read by the card reader 18 is determined as additional data and the additional data is stored by being associated with recorded images.

The contents of the additional data are determined based on the recorded time of the recorded images and time related information (time information included in the purchase record (use record) in detail) read by the card reader 18.

For example, information concerning a purchase which is before the recorded time of the recorded image as well as the latest purchase is determined as "additional data". In other words, information concerning purchase record at the time nearest to the recorded time of the recorded image is determined as "additional data".

More specifically, at the recorded time point of a time T23, name information of the purchasing store PA (for example, a store name "* * * specialty store") included in the purchase information nearest (T21) to the time T22 read by the card reader 18 is stored by being associated with the recorded image. Specifically, information of the latest purchasing store PA with respect to the recorded time of the recorded images is stored by being associated with the recorded image.

At the time of imaging after the time T22, the latest purchase related information as described above (for example, the name of the store PA "* * * specialty store") is stored in the user comment area (FIG. 5) and the like. The imaging operation with data addition is continued until "data addition mode" is cancelled at a time T29.

The same operation will be executed afterward.

For example, assume that the user UA purchases another item at another store PB at a time T31, and performs the above approaching operation (touch operation) and the like at a time T32 after that. At recorded time points after the time T32, information concerning the nearest purchase record (for example, name information of the store PB) is stored by being associated with the recorded images.

According to the above operation, data is automatically added to the recorded image data, therefore, it is possible to easily add information to the recorded images. That is, information which can be used for search and/or filing of information and the like can be easily added. In addition, data can be automatically added to recorded image data by using the non-contact type IC card 20B which is usually carried, therefore, it is possible to add information to recorded images in various situations.

Especially, place information (for example, store name information) included in purchase record in the non-contact type IC card 20B is used as additional data, thereby adding place information near the recorded place of the recorded image easily.

In the embodiment, information concerning purchase record, specifically, store information is cited as "additional data", however, it is not limited to this. For example, it is preferable that information of a purchased item (for example, an item name "* * * candy") included in the latest purchase record is used as "additional data". It is also preferable that a price or the like of a purchased item is used as "additional data".

Additionally, it is preferable to use information concerning purchase of an entrance fee of a facility as "additional data" as shown in FIG. 12. More specifically, facility name information (for example, "* * * stadium") can be used as information concerning purchase of the entrance fee of the facility (for example, an entrance fee for "* * * stadium").

It is not limited to the example in which single type of data is added to each recorded image data as additional data, however, it is also preferable that plural types of data are added to each recorded image data as additional data.

The fourth embodiment can be also modified in the same manner as in the second embodiment with respect to the first embodiment. It is further possible that the fourth embodiment is modified in the same manner as in the third embodiment with respect to the first embodiment. That is, it is preferable that additional data is added to the recorded data afterward, or it is preferable that correction operation is executed with respect to the additional data.

5. Fifth Embodiment

In the embodiments, the non-contact type IC cards 20A, 20B were cited as the non-contact communication type portable information storage device, however, it is not limited to this. In the fifth embodiment, a case in which a cellular phone device (20C) is used as the non-contact communication type portable information storage device will be explained as an example. Hereinafter, explanation will be made by focusing on points which are different from the fourth embodiment.

Figure 13:
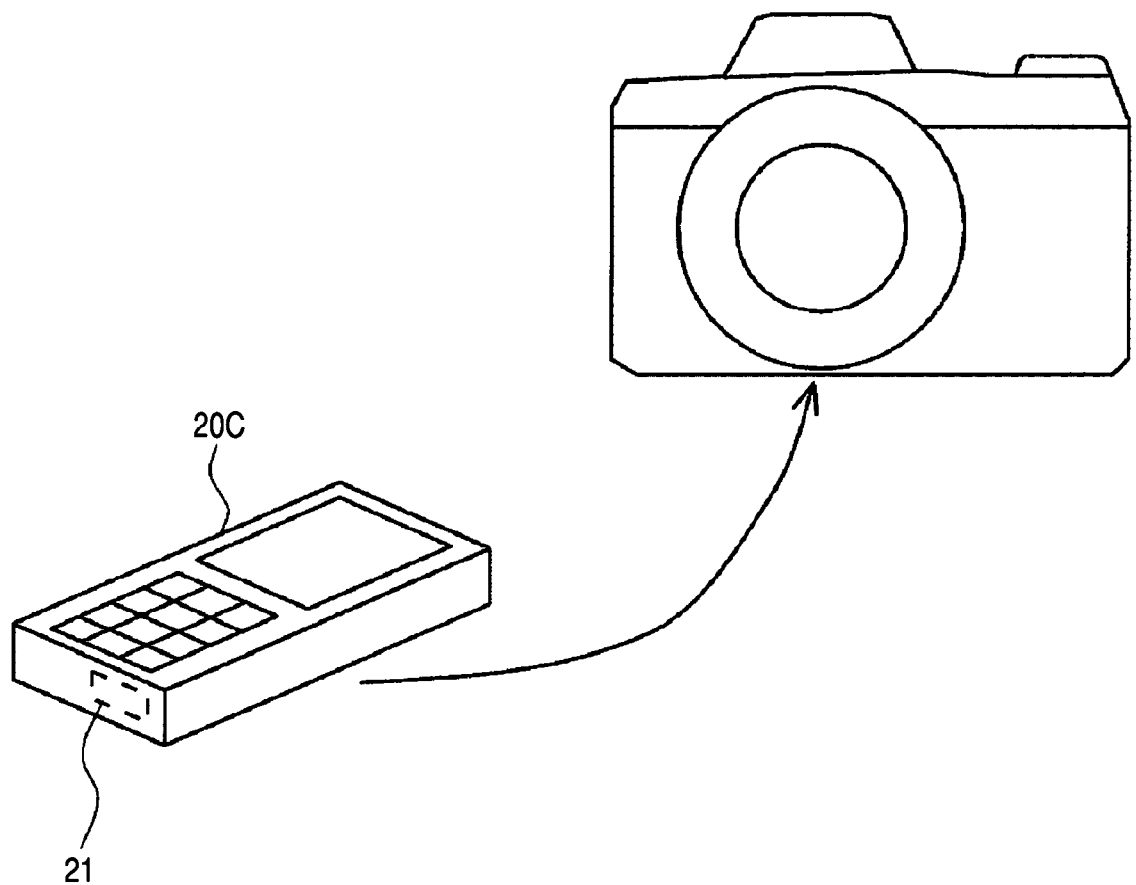
FIG. 13 is a view showing a system configuration according to a fifth embodiment.

As shown in FIG. 13, the cellular phone device 20C includes an IC chip 21 which can perform functions (the information storing function, the non-contact communication function with respect to the digital camera 10A and the like) equivalent to the above non-contact type IC card 20B. That is, the cellular phone device 20C has the settlement function and the like by electronic money in the same manner as the non-contact type IC card 20B. The cellular phone device 20C functions as a non-contact communication type portable information storage device.

In the fourth embodiment, the approaching operation with respect to the electronic money terminal MT (time T21) and the approaching operation with respect to the digital camera 10A (time T22) are performed by using the non-contact type IC card 20B (electronic money card) (refer to FIG. 10).

In the fifth embodiment, the approaching operation with respect to the electronic money terminal MT (time T21) and the approaching operation with respect to the digital camera 10A (time T22) are performed by using the cellular phone device 20C (in more detail, the included IC chip 21).

Specifically, when the cellular phone device 20C is allowed to approach the electronic money terminal MT in the store by the user UA at the time T21, reading operation and writing operation concerning information of the IC chip 21 are performed and settlement processing is performed by the electronic money terminal MT.

When the cellular phone device 20C is allowed to approach the digital camera 10A with a prescribed operation (pressing the card reading button 143 and the like) by the user UA at the time T22, reading operation concerning information of the IC chip 21 is executed by the digital camera 10A.

Specifically, the digital camera 10A reads various information in the IC chip 21 of the cellular phone device 20C by using the card reader 18 and stores the information in the non-volatile memory 8. The card reader 18 functions as a reading unit which reads not only card information but also information in the IC chip 21 included in the cellular phone device 20C.

At this time, the digital camera 10A sets the mode of the digital camera 10A to "data addition mode".

After that, the same operation as the fourth embodiment is executed. For example, when imaging is performed by the digital camera 10A after the time T22 (refer to FIG. 10), information (place information and the like) based on use record (purchase record) read by the card reader 18 is determined as additional data, which is stored by being associated with recorded images.

According to the above operation, data is automatically added to recorded image data, therefore, information can be easily added to the recorded images. That is, information which can be used for search and/or filing of information can be easily added. Additionally, data can be automatically added to recorded image data by using the cellular phone device 20C which is usually carried, therefore, it is possible to add information to the recorded images in various situations.

In the above embodiment, the case in which the IC chip 21 of the cellular phone device 20C performs functions equivalent to the non-contact type IC card 20B is cited as an example, however, it is not limited to this. For example, it is also preferable that the IC chip 21 performs functions equivalent to the non-contact type IC card 20A. According to this, various information recorded in the non-contact type IC card 20A as a ticket card can be stored by being associated with recorded images.

It is also preferable that the IC chip 21 of the cellular phone device 20 performs functions equivalent to both the non-contact type IC card 20A and the non-contact type IC card 20B. Further, it is preferable that the IC chip 21 performs functions equivalent to plural types of non-contact type IC cards 20A or plural types of non-contact type IC cards 20B. In the case that the cellular phone device 20C includes functions equivalent to plural types of IC cards as described above, the following operation may be executed.

Specifically, first, when the cellular phone device 20C is allowed to approach the digital camera 10A with a prescribed operation (pressing of the card reading button 143 and the like) by the user UA at the time T22, reading operation concerning information of the IC chip 21 is executed by the digital camera 10A. In detail, non-contact communication between the cellular phone device 20C and the digital camera 10A is executed by using the coil for communication provided in the cellular phone device 20C and the card reader 18 of the digital camera 10A, and information is read from the storage area in the IC chip 21 included in the cellular phone device 20C.

Figure 14:
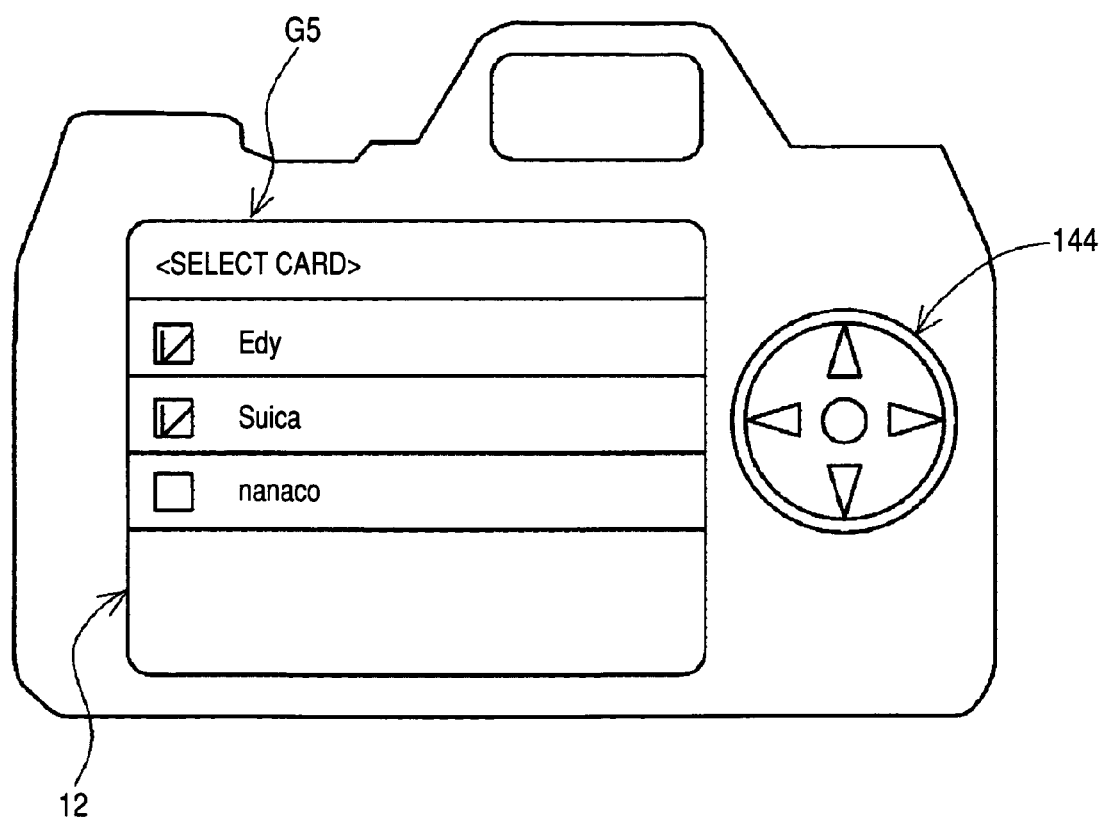
FIG. 14 is a view showing a selection screen.

After that, the digital camera 10A displays a selection screen G5 as shown in FIG. 14 on a back-face monitor 12. Then, one desired card function, or two or more functions are selected in plural card functions existing in the cellular phone device 20C (for example, "Edy" (Trademark), "Suica" (Trademark), "nanako" (Trademark) and the like) by the user UA according to the operation by the multi-selector 144. FIG. 14 shows a state in which checks are put in desired checkboxes according to the selection operation by the user UA, and card functions to which checks are put are selected. In the imaging operation after the selection operation is performed, information corresponding to the selected card functions is added to the recorded image data.

The above operation can be executed. In this case, the case in which selection of card functions is performed after the reading operation of information in the IC chip 21 is cited as an example, however, it is not limited to this. For example, it is preferable that the selection of card functions is performed in advance and information concerning the selected card functions is read from the IC chip 21 after that.

6. Sixth Embodiment

In the fifth embodiment, data recorded in the IC chip 21 of the cellular phone device 20C as well as including the contents depending on the types of card functions is used as "additional data" to be added to the recorded image data.

In a sixth embodiment, a case in which data including the contents not depending on the card type, in other words, data of the optional contents is used as "additional data" will be cited as an example.

Figure 15:
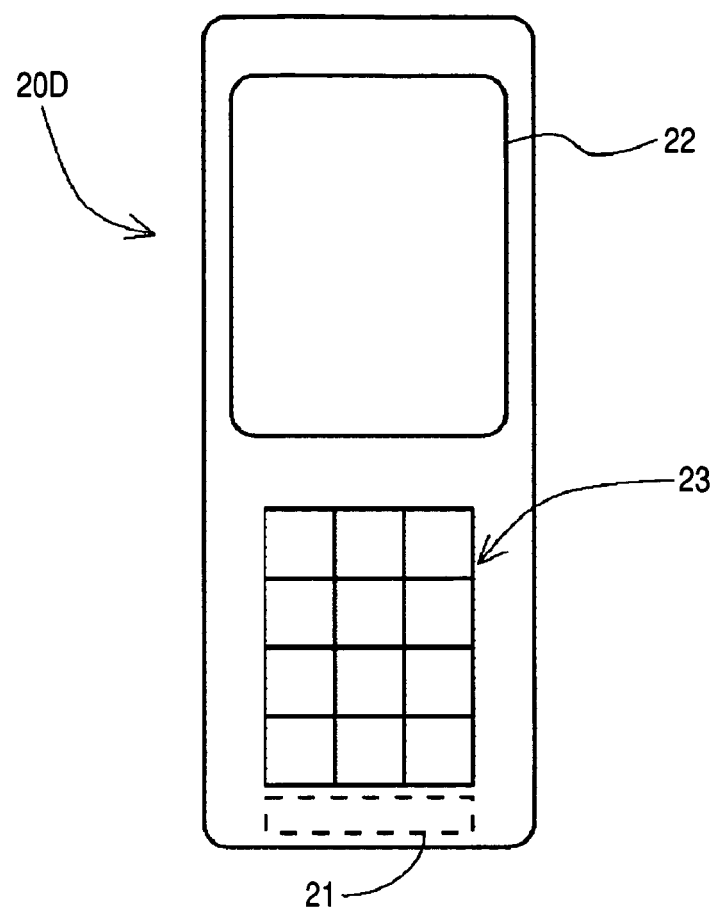
FIG. 15 is a view showing a cellular phone device according to a sixth embodiment.
Figure 16:
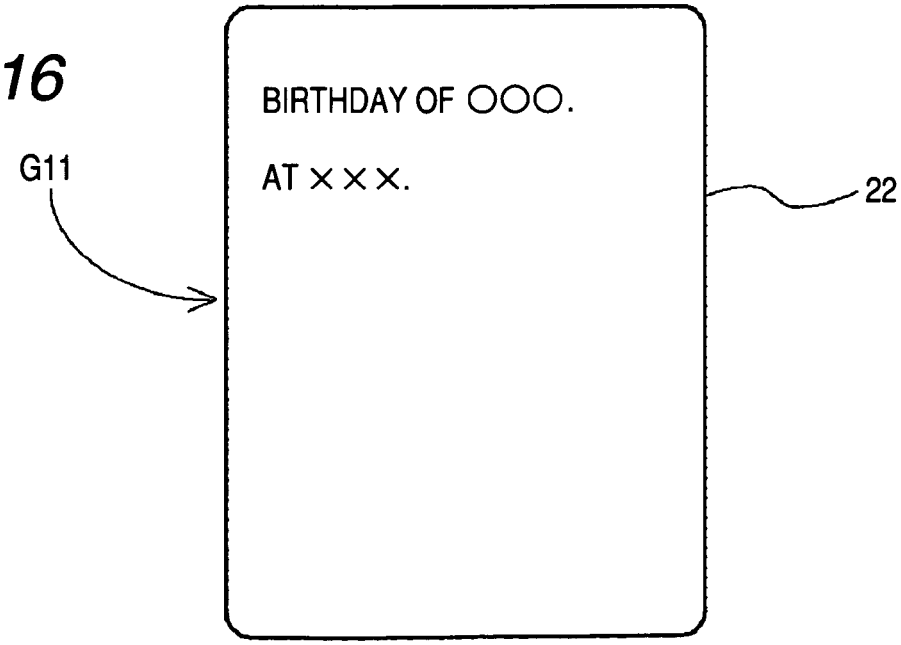
FIG. 16 is a view showing the display contents in a display of the cellular phone device.
Figure 17:
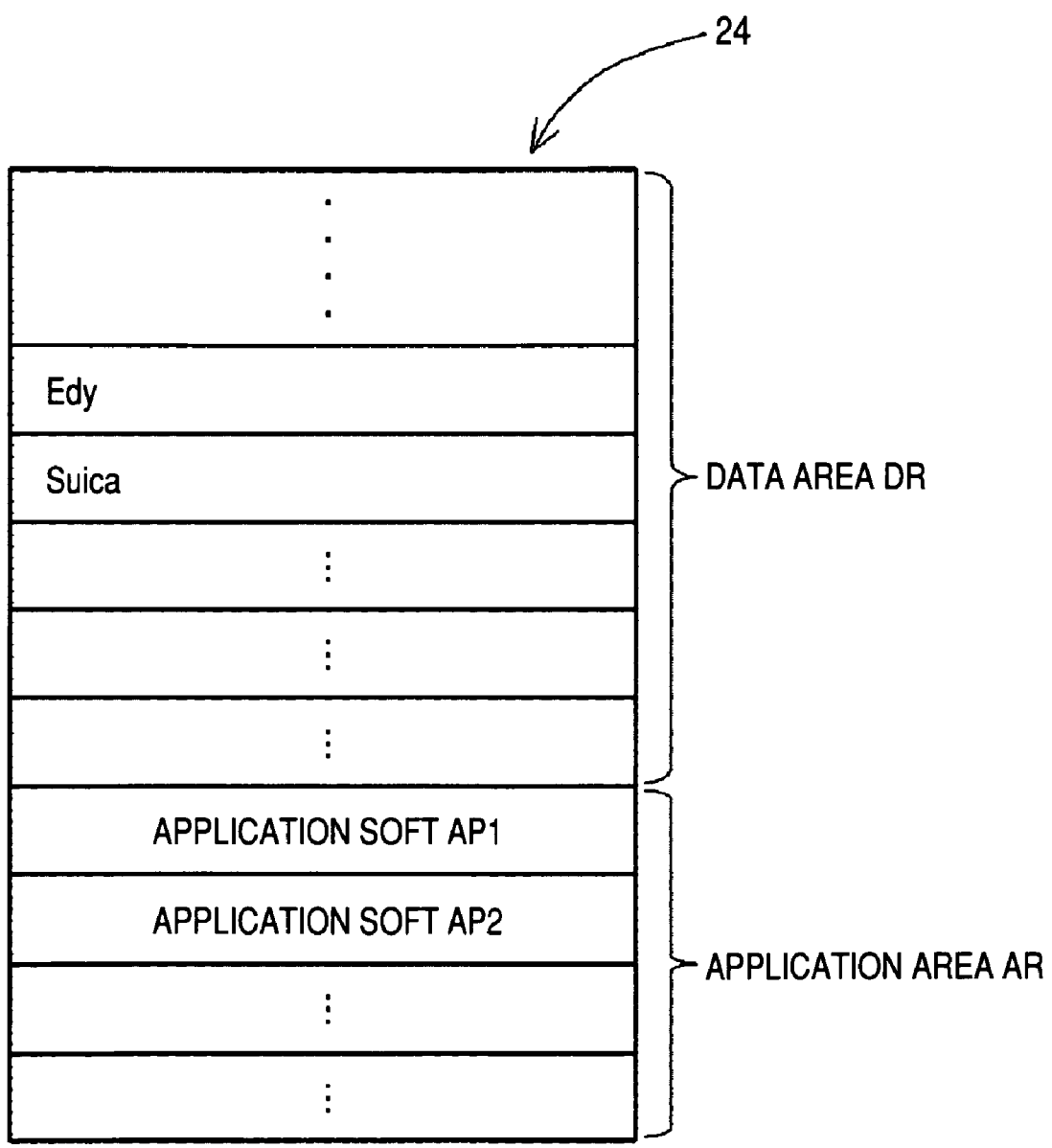
FIG. 17 is a view showing a memory map in the cellular phone device.

FIG. 15 is a view showing a cellular phone device 20D and FIG. 16 is a view showing the contents displayed on a display 22 of the cellular phone device 20D. FIG. 17 is a view showing a memory map in the cellular phone device 20D.

As shown in FIG. 17, a non-volatile memory 24 provided inside the cellular phone device 20D includes an application area AR and a data area DR. The application area AR is an area storing application software AP1, AP2, . . . which can be executed on the cellular phone device 20D (specifically, a computer included in the cellular phone device 20D (CPU and the like)). The data area DR includes an area storing data for various cards such as "Edy" (Trademark), "Suica" (Trademark) and the like as well as an area storing other data such as incoming-call tone data and address-book data.

The application software AP1 realizes the following function by being performed on the cellular phone device 20D.

When the execution of the application software AP1 is started and a prescribed operation is performed, an input-receiving screen G11 shown in FIG. 16 is displayed on the display 22. In response to this, the user inputs characters which are desired to be added to recorded image data in the input-receiving screen G11 by using an input unit (including numeral keys and the like) 23 of the cellular phone device 20D. In the information input operation, for example, character information ("Birthday of * * *" and so on) which is desired to be associated with the recorded image is inputted as shown in FIG. 16. The inputted character information is temporarily stored in a prescribed area R1 in the non-volatile memory 24 (an address area storing data for the application software AP1 in the application area AR or a prescribed address area in the data area DR).

Next, the user performs a prescribed operation (for example, a pressing of the card reading button 143 and the like) to the digital camera 10A as well as performs a prescribed operation (for example, an operation of selecting a communication start menu from a menu screen and the like) to the cellular phone device 20D. After that, the user performs the approaching operation of allowing the cellular phone device 20D (specifically, the IC chip 21) to approach the bottom face of the digital camera 10A to the extent that the cellular phone device 20D slightly touches the bottom face thereof.

According to the approaching operation, the cellular phone device 20D performs communication with respect to the digital camera 10A by using the coil for communication included in the cellular phone device 20D. The cellular phone device 20D executes non-contact type communication with respect to the digital camera 10A under control of the application software AP1. The IC chip 21 transmits information to the digital camera 10A, which is temporarily stored in the prescribed area R1 in the non-volatile memory of the cellular phone device 20D as information which should be associated with the recorded images in the digital camera 10A. On the other hand, the digital camera 10A receives (reads) the character information by using the communication function of the card reader 18 and the IC chip 21 and stores the received character information in the non-volatile memory 8. The digital camera 10A sets the mode of the digital camera 10A to "data addition mode".

After that, the same operation as the fourth embodiment will be executed. For example, when imaging is performed by the digital camera 10A after the time T22 (refer to FIG. 10), the character information (place information and the like) inputted by using the cellular phone device 20D and read out by the card reader 18 is determined as additional data, and the additional data is stored by being associated with recorded images.

According to the operation, data is automatically added to recorded image data, therefore, information can be easily added to recorded images. That is, it is possible to easily add information which can be used for search and/or filing of information. Also, data can be automatically added to recorded image data by using the cellular phone device 20D which is usually carried, therefore, it is possible to add information to recorded images in various situations.

Especially, the inputting operationality using the input unit (including numeral keys and the like) 23 of the cellular phone device 20D is superior to the inputting operationality by a software keyboard using, for example, the multi-selector 144 of the digital camera 10A (though it is inferior to the inputting operationality using a keyboard for inputting in a personal computer). Therefore, it is possible to input additional data of the optional contents relatively easily by using the inputting unit (including numeral keys) 23 of the cellular phone device 20D. The character information inputted by the easy input means in this manner can be further added to recorded image data easily by communication between the IC chip 21 and the card reader 18.

7. Seventh Embodiment

In the second embodiment, the case in which information of the non-contact type IC card 20A is added to recorded image data in the memory card 9 of the digital camera 10A at a time by the communication between the non-contact type IC card 20A and the digital camera 10A is cited as an example, however, it is not limited to this. For example, the same idea can be applied to electronic apparatuses other than the digital camera 10A. In the seventh embodiment, such modification example will be explained.

Figure 18:
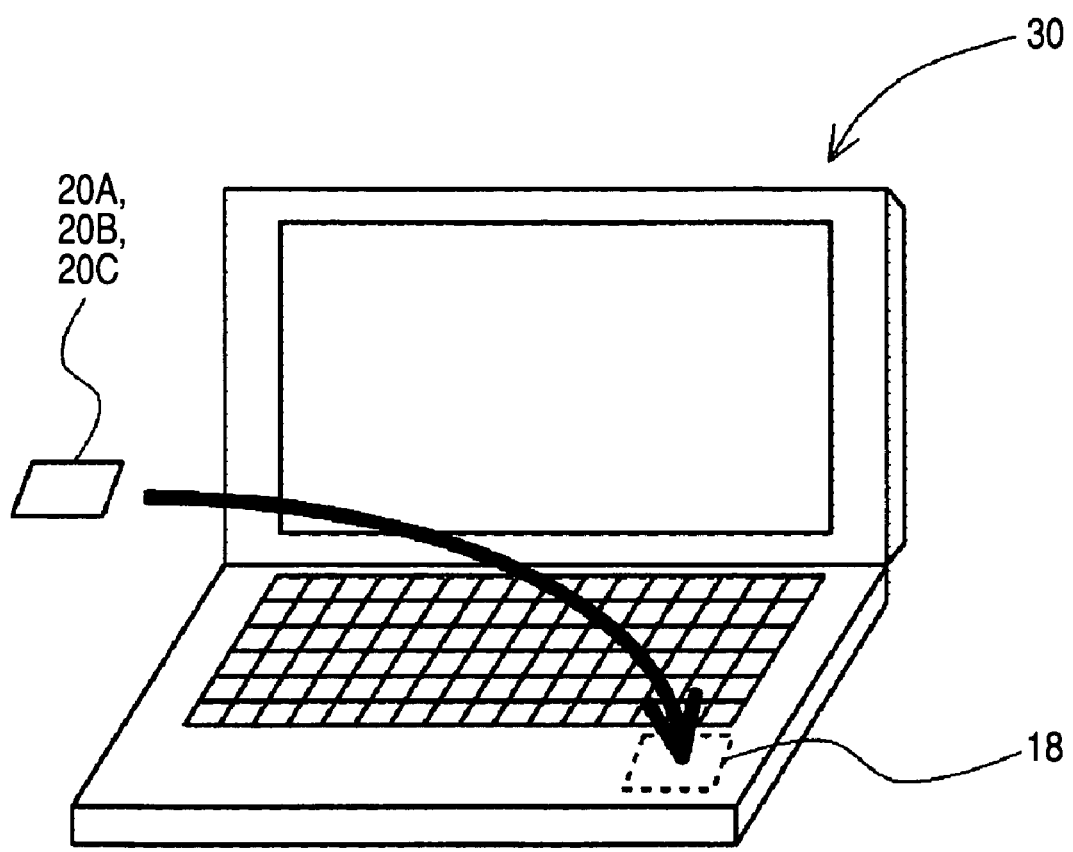
FIG. 18 is a view showing a system configuration according to a seventh embodiment.

FIG. 18 is a view showing an electronic apparatus 30 according to the seventh embodiment. In this case, a personal computer is cited as the electronic apparatus 30 which processes recorded image data. The electronic apparatus 30 and the non-contact type IC card 20A form a recorded image management system.

As shown in FIG. 18, the electronic apparatus 30 includes the card reader 18. In the same manner as the second embodiment, data addition processing is not executed at recorded time points of respective recorded images by the digital camera 10A.

After that, recorded image data in the digital camera 10A is transferred from the digital camera 10A to the electronic apparatus 30 at a certain time point, then, stored in a prescribed folder in the electronic apparatus (personal computer) 30 to be managed. After that, when a prescribed operation (a selection operation in the menu screen and the like) is executed in a state in which a prescribed program (image management program) is executed in the electronic apparatus 30, reading processing by the card reader 18 is made to be valid. When the approaching operation of allowing the non-contact type IC card 20A to approach the card reader 18 of the electronic apparatus 30 is performed, batch data addition processing with respect to the recorded images in a predetermined folder is performed.

For example, in the same manner as FIG. 7, information of the nearest exit station NB (for example, station name "Kyoto station") is added to recorded image data recorded from the time T1 to the time T4. Also, information of the nearest exit station ND (for example, station name "Kobe station") is added to recorded image data recorded from the time T5 to the time T9.

According to the above operation, the same advantages as the second embodiment can be obtained.

The case in which the batch data addition processing concerning all recorded images in the predetermined folder is executed is cited as an example, however, it is not limited to this. For example, various modifications cited in the second embodiment can be applied.

In this case, the non-contact type IC card 20A is used as a non-contact communication type portable information storage device, however, it is not limited to this. For example, it is also preferable that the non-contact type IC card 20B is used. Further, it is preferable that the cellular phone device 20C including the IC chip 21 and the like are used.

8. Others

Embodiments of the invention have been explained as the above, and the invention is not limited to the contents explained as the above.

For example, in the seventh embodiment, the personal computer is cited as an electronic apparatus, however, it is not limited to this, and other types of electronic apparatuses such as a photo viewer can be used.

Also concerning the fourth embodiment, the fifth embodiment and the sixth embodiment, the same modification in the second embodiment with respect to the first embodiment is possible. Further, the same modification in the third embodiment with respect to the first embodiment or the like is also possible. Specifically, it is preferable that additional data is added to the recorded data afterward or it is preferable that the correction operation with respect to additional data is performed.

In the respective embodiments, the case in which the user of the imaging apparatus 10A is the same as the user of the non-contact communication type portable information storage device is cited, however, it is not limited to this, and it is not always necessary that the user of the imaging apparatus 10A and the user of the non-contact communication type portable information storage device are not the same. For example, when the user UA of the imaging apparatus 10A is accompanied by a user UB of the non-contact type IC card 20A or the like, it is possible that data of the non-contact type IC card 20A possessed by the accompanying user UB is allowed to be read by the imaging apparatus 10A possessed by the user UA.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    a reading means for reading information stored in a non-contact communication type portable information storage device, the information comprising time information indicating when the portable information storage device was used; and
    a control means for:
        determining, for a recorded image, first information from the information stored in the portable information storage device based on recording time of the recorded image and the time information, the first information concerning usage of the portable information storage device at a time before and nearest to the recorded time of the recorded image;
        controlling the reading means to read the first information; and
        storing the first information by associating the first information with the recorded image,
        wherein determining the first information and associating the first information with the recorded image are automatically cancelled upon a predetermined condition.

2. The imaging apparatus according to claim 1,
    wherein information stored in the portable information storage device includes time related information stored by being associated with time, and
    wherein the control means determines the first information based on recorded time of the recorded images and time related information read by the reading means.

3. The imaging apparatus according to claim 1,
    wherein information stored in the portable information storage device includes time related information in which place information and time corresponding to the place information are stored by being associated each other, and
    wherein the control means determines the place information as the first information based on the recorded time of the recorded images and the time related information read by the reading means.

4. The imaging apparatus according to claim 2,
    wherein the time related information includes use record of public transportation, and
    wherein the control means determines first information based on time information included in the use record and recorded time of the recorded images.

5. The imaging apparatus according to claim 4,
    wherein the control means determines place information concerning use record of a time nearest to the recorded time of the recorded images as the first information.

6. The imaging apparatus according to claim 5,
    wherein the control means stores information of an exit station from which a user exited before recorded time of the recorded images as well as at the latest time by associating the information with the recorded images.

7. The imaging apparatus according to claim 2,
    wherein the time related information includes purchase record using electronic money, and
    wherein the control means determines the first information based on time information included in the purchase information and recorded time of the recorded images.

8. The imaging apparatus according to claim 7,
    wherein the control means determines information concerning purchase record of a time nearest to the recorded time of the recorded images as the first information.

9. The imaging apparatus according to claim 8,
    wherein the first information includes place information concerning the purchase record.

10. The imaging apparatus according to claim 9,
    wherein the purchase record includes information concerning purchase of entrance fees of facilities, and
    wherein the first information includes facility name information concerning the purchase record.

11. The imaging apparatus according to claim 9,
    wherein the first information includes store name information concerning the purchase record.

12. The imaging apparatus according to claim 1,
    wherein the portable information storage device is a cellular phone device including an IC chip having storage areas, which is capable of performing non-contact communication with the imaging apparatus,
    wherein information stored in the cellular phone device includes input information inputted by an input means provided in the cellular phone device, and
    wherein the control means determines the input information read by the reading means as the first information.

13. An imaging system comprising:
    a non-contact communication type portable information storage device; and
    an imaging apparatus,
    wherein the imaging apparatus includes a reading means and a control means,
    the reading means is configured for reading information stored in the portable information storage device, the information comprising time information indicating when the portable information storage device was used,
    the control means is configured for:
        determining, for a recorded image, first information from the information stored in the portable information storage device based on recording time of the recorded image and the time information, the first information concerning usage of the portable information storage device at a time before and nearest to the recorded time of the recorded image;
        controlling the reading means to read the first information; and
        storing the first information by associating the first information with the recorded image,
        wherein determining the first information and associating the first information with the recorded image are automatically cancelled upon a predetermined condition.

14. The imaging system according to claim 13,
    wherein the portable information storage device is a non-contact type IC card.

15. The imaging system according to claim 13,
    wherein the portable information storage device is a cellular phone device including an IC chip having storage areas, which is capable of performing non-contact communication with the imaging apparatus.

16. A non-transitory tangible computer-readable medium on which computer readable instructions of a program are stored, the instructions, when executed by a processor, cause the processor to perform:

reading information stored in a non-contact communication type portable information storage device, the information comprising time information indicating when the portable information storage device was used;

determining, for a recorded image, first information from the information stored in the portable information storage device based on recoding time of the recorded image and the time information, the first information concerning usage of the portable information storage device at a time before and nearest to the recorded time of the recorded image;

controlling the reading means to read the first information; and storing the first information by associating the first information with the recorded image, wherein determining the first information and associating the first information with the recorded image are automatically cancelled upon a predetermined condition.

17. An imaging apparatus comprising:

a reading unit configured to read information stored in a non-contact communication type portable information storage device, the information comprising time information indicating when the portable information storage device was used; and a control unit configured to:

determine, for a recorded image, first information from the information stored in the portable information storage device based on recording time of the recorded image and the time information, the first information concerning usage of the portable information storage device at a time before and nearest to the recorded time of the recorded image;

control the reading means to read the first information; and store the first information by associating the first information with recorded image, wherein determining the first information and associating the first information with the recorded image are automatically cancelled upon a predetermined condition.

18. An imaging system comprising:

a non-contact communication type portable information storage device; and an imaging apparatus, wherein the imaging apparatus includes a reading unit and a control unit, the reading unit is configured to read information stored in the portable information storage device, the information comprising time information indicating when the portable information storage device was used, and the control unit is configured to:

determine, for a recorded image, first information from the information stored in the portable information storage device based on recording time of the recorded image and the time information, the first information concerning usage of the portable information storage device at a time before and nearest to the recorded time of the recorded image;

control the reading means to read the first information; and store the first information by associating the first information with recorded image, wherein determining the first information and associating the first information with the recorded image are automatically cancelled upon a predetermined condition.

19. An electronic apparatus comprising:

a reading unit configured to read information stored in a non-contact communication type portable information storage device, the information comprising time information indicating when the portable information storage device was used; and a control unit configured to:

determine, for a recorded image, first information from the information stored in the portable information storage device based on recording time of the recorded image and the time information, the first information concerning usage of the portable information storage device at a time before and nearest to the recorded time of the recorded image;

control the reading means to read the first information; and store the first information by associating the first information with the recorded image, wherein determining the first information and associating the first information with the recorded image are automatically cancelled upon a predetermined condition.

20. The non-transitory tangible computer readable medium of claim 16 comprises a ROM.

* * * * *